US012195697B2

(12) United States Patent
Reimers et al.

(10) Patent No.: US 12,195,697 B2
(45) Date of Patent: *Jan. 14, 2025

(54) METHOD FOR REFINED PALM OIL PRODUCTION WITH REDUCED 3-MCPD FORMATION

(71) Applicant: Arisdyne Systems, Inc., Cleveland, OH (US)

(72) Inventors: Peter Reimers, Shaker Heights, OH (US); Oleg Kozyuk, North Ridgeville, OH (US); Darren Litle, Flowery Branch, GA (US)

(73) Assignee: Arisdyne Systems, Inc., Cleveland, OH (US)

( * ) Notice: Subject to any disclaimer, the term of this patent is extended or adjusted under 35 U.S.C. 154(b) by 31 days.

This patent is subject to a terminal disclaimer.

(21) Appl. No.: 18/123,013

(22) Filed: Mar. 17, 2023

(65) Prior Publication Data

US 2023/0227749 A1 Jul. 20, 2023

Related U.S. Application Data

(63) Continuation of application No. 17/053,215, filed as application No. PCT/US2019/030515 on May 3, 2019, now Pat. No. 11,634,657.

(60) Provisional application No. 62/667,781, filed on May 7, 2018.

(51) Int. Cl.

| | |
|---|---|
| ***C11B 3/04*** | (2006.01) |
| ***C11B 3/00*** | (2006.01) |
| ***C11B 3/16*** | (2006.01) |

(52) U.S. Cl.

CPC ................ *C11B 3/001* (2013.01); *C11B 3/04* (2013.01); *C11B 3/16* (2013.01)

(58) Field of Classification Search

CPC ............. C11B 3/001; C11B 3/04; C11B 3/16; B01F 25/45

See application file for complete search history.

(56) References Cited

U.S. PATENT DOCUMENTS

| | | | |
|---|---|---|---|
| 5,931,771 | A | 8/1999 | Kozyuk |
| 5,937,906 | A | 8/1999 | Kozyuk |
| 5,971,601 | A | 10/1999 | Kozyuk |
| 6,502,979 | B1 | 1/2003 | Kozyuk |
| 6,802,639 | B2 | 10/2004 | Kozyuk |
| 7,086,777 | B2 | 8/2006 | Kozyuk |
| 7,207,712 | B2 | 4/2007 | Kozyuk |
| 7,422,360 | B2 | 9/2008 | Kozyuk |
| 7,708,453 | B2 | 5/2010 | Kozyuk |
| 9,217,120 | B2 | 12/2015 | Bhaggan et al. |
| 9,290,717 | B1 | 3/2016 | Kozyuk et al. |
| 9,371,502 | B2 | 6/2016 | Augustin et al. |
| 2011/0167772 | A1 | 7/2011 | Piucci, Jr. et al. |
| 2017/0135363 | A1 | 5/2017 | Dietz |
| 2017/0204349 | A1 | 7/2017 | Kozyuk et al. |

FOREIGN PATENT DOCUMENTS

| | | | |
|---|---|---|---|
| EP | 2471897 | A1 | 7/2012 |
| WO | 2010/063450 | A1 | 6/2010 |
| WO | 2011/005081 | A1 | 1/2011 |
| WO | 2011/036072 | A1 | 3/2011 |
| WO | 2011/069028 | A1 | 6/2011 |
| WO | 2012/106768 | A1 | 8/2012 |
| WO | 2012/107230 | A1 | 8/2012 |
| WO | 2015/057139 | A1 | 4/2015 |

OTHER PUBLICATIONS

Jul. 5, 2019—(WO) International Search Report & Written Opinion—App. No. PCT/US2019/030515.

Pudel, F., et al., On the necessity of edible oil refining and possible sources of 3-MCPD and glycidyl esters, Eur. J. Lipid Sci., No. 113, pp. 368-373 (Year: 2011).

*Primary Examiner* — Yate' K Cutliff

(74) *Attorney, Agent, or Firm* — Banner & Witcoff, Ltd.

(57) ABSTRACT

Methods of refining palm oil in order to produce a refined, bleached and deodorized palm oil with reduced level of 3-monochloropropane-1, 2-diol (3-MCPD) ester are disclosed. The methods may include premixing a palm oil with an acid to chelate metals and form a reaction mixture, and subjecting the reaction mixture to hydrodynamic cavitation mixing for less than 1 second.

20 Claims, No Drawings

METHOD FOR REFINED PALM OIL PRODUCTION WITH REDUCED 3-MCPD FORMATION

CROSS-REFERENCE TO RELATED APPLICATION

This application is a continuation of U.S. application Ser. No. 17/053,215 filed Nov. 5, 2020, which is the U.S. National Stage entry under 35 U.S.C. § 371 of International Application No. PCT/US19/30515, filed May 3, 2019, which itself claims priority to U.S. Provisional Application No. 62/667,781, filed May 7, 2018. Benefit of the filing date of each of these prior applications is hereby claimed, and the contents of each of these prior applications is hereby incorporated by reference in their entirety for any and all non-limiting purposes.

TECHNICAL FIELD

The present disclosure relates to improved methods of refining palm oil in order to produce a refined, bleached and deodorized (RBD) palm oil with reduced level of 3-monochloropropane-1,2-diol (3-MCPD) ester.

BACKGROUND

The refining process typically consists of three major steps: degumming, bleaching and deodorizing. Oil obtained after completion of the refining is normally considered suitable for human consumption and may therefore be used in the production of any number of foods and beverages.

It has now been found that the crude oil refining process itself contributes to the introduction, of various levels of 3-monochloropropane-1,2-diol fatty acid esters (3-MCPD esters) amounts are depending on oil type and refining process.

Most vegetable oils show 3-MCPD ester contents between 200-800 ppb.

Palm oil contain highest level of 3-MCPD ester (above 5000 ppb) compared to other oils. Free 3-MCPD released from hydrolysis of 3-MCPD esters during intestinal digestion has been highlighted to be potentially causing adverse health effects.

Formation of 3-MCPD esters has been observed to form at elevated temperature during the process of bleaching and deodorization from bound precursors that could be present in the crude oil. Other 3-MCPD ester precursors may be introduced in other stages of the entire oil production process prior to deodorization. As well, it is understood, that the introduction of acid, whether during the acid degumming step or from the acidity of the bleaching clay and high temperatures could lead to the formation of 3-MCPD esters.

Palm oil requires a series of processing steps to transform crude oil into RBD palm oil having acceptable degree of purity and organoleptic properties.

WO 2010/063450 describes a method for reducing the 3-MCPD content in refined vegetable oils by treatment with a bleaching earth.

WO2011/005081 describes a method for reducing the 3-MCPD by contacting unused triglyceride oils with highly porous silicate adsorbents.

WO2011/036072 method utilizes enzymatic conversion of 3-MCPD into mono- and diglycerol.

WO2011/069028 describes methods for removing glycidyl esters from an oil wherein said methods comprises contacting the oil with an adsorbent, contacting the oil with an enzyme or deodorizing the oil at a temperature no greater than 240 degrees C., deodorizing the oil with at least one sparge, contacting the oil with a solution comprising an acid, or re-bleaching the oil WO2012/107230 describes a method for the production of refined oil having reduced 3-MCPD ester content characterized in that it comprises re-bleaching and re-deodorizing the oil, wherein the final deodorization is carried out at a temperature at least 40° C. lower than the previous deodorization step.

WO2015/057139 describes a process for the mitigation of 3-MCPD ester in vegetable oil by subjecting the vegetable oil to a vacuum distillation at about 200-280° C. and at a pressure of about 0.001-3.0 mbar.

U.S. Pat. No. 9,217,120 describes a method of treating a palm oil comprising contacting the oil with at from 0.5% to 5% by weight of the oil of an acid-activated bleaching earth and deodorizing the oil at a temperature of from 180 to 195° C. for a time of from 1 to 4 hours.

Thus, there remains a need to reduce the concentrations of 3-MCPD esters in palm oil for foodstuff. The present disclosure addresses such needs and interests.

SUMMARY

In one aspect, the disclosure relates to a method for refined palm oil production with reduced 3-MCPD formation. The method may include (a) premixing a palm oil with an acid to chelate metals and form a reaction mixture, (b) subjecting the reaction mixture obtained in step (a) to hydrodynamic cavitation mixing for a duration time of less than 1 second.

DETAILED DESCRIPTION

The method according to the disclosure may comprise the following stages.

In a first stage a palm oil containing phospholipids is premixed with at an amount of an acid appropriate to chelate metals and/or hydrolyze the phospholipids in the oil, and a reaction mixture is formed. In an aspect, the reaction mixture may contain at a stoichiometric amount of acid necessary to hydrolyze the phospholipids, a greater than stoichiometric amount, or a less than stoichiometric amount. For example, in some embodiments, the mixture may contain less than about 80% stoichiometric amount of the acid necessary to hydrolyze phospholipids, or less than about 70%, or less than about 60%.

In a second stage the reaction mixture may be subjected to the hydrodynamic cavitation mixing. The hydrodynamic cavitation mixing may be performed for a relatively short time period. The hydrodynamic cavitation mixing time is defined as residence time in the cavitation chamber and calculated by internal volume of cavitation chamber divided by the flowrate through chamber. The hydrodynamic cavitation mixing time may be less 5 seconds, less than 3 seconds, less than 1 second, less than 0.9 seconds, less than 0.75 seconds, less than 0.5 seconds, less than 0.4 seconds, or less than 0.3 seconds. The mixing may occur by conveying the reaction mixture through one or more orifices, nozzles or apertures of a local constriction. Hydrodynamic cavitation mixing time may be equal to total residence time in the chamber of the cavitation processor. Each processing orifice or nozzle or aperture may have an inside opening ranging from and including about 0.5 mm to about 5 mm Each inside opening may be equal to the inside diameter for a circular orifice, nozzle or aperture, or may be equal to the width of the gap for a non-circular orifice, nozzle, or aperture.

With the benefit of this disclosure, those skilled in the art will recognize that a wide variety of devices may be used to perform the cavitation mixing in methods disclosed herein, e.g., the devices disclosed in U.S. Pat. Nos. 5,931,771; 5,937,906; 5,971,601; 6,502,979; 6,802,639; 7,086,777; 7,207,712; 7,422,360; 7,708,453; and 9,290,717.

In a third stage after the cavitation, the reaction mixture may be additionally mixed, for example stirred or otherwise agitated without any cavitation. The additional mixing may occur for at least 15 minutes, at least 30 minutes, or at least 60 minutes. After the additional mixing, the reaction mixture may be transferred to a centrifugation stage in order to separate an aqueous phase containing precursors from the oil.

After the mixing and/or centrifugation, the oil may be transferred to a vessel or conduit for bleaching and/or deodorizing. The bleaching may be carried out at temperatures of about 100° C. or more, such as 105° C.-110° C. The deodorizing may be carried out at temperatures of about 100° C. or more, about 150° C. or more, about 200° C. or more, about 225° C. or more, about 250° C. or more, about 275° C. or more, or about 300° C. or more. In an embodiment, the deodorizing may be carried out at a temperature of about 250° C., and less than about 325° C.

Water may be added to the reaction mixture during or after the first stage, and with, before, or after the acid and/or oil. In some embodiments, the amount of this added water may be 2% by weight of the oil or less, in others about 5% by weight or less, and in still others about 10% by weight or less. In some embodiments, the amount of added water is about 2%, about 2-5%, about 5%, about 5-10%, or about 10% by weight of the oil. In an embodiment, the amount of added water may be about 2% or more, about 5% or more, or about 10% or more by weight of the oil.

The palm oil refining process before bleaching and deodorization is typically maintained at a temperature of about 40° C. to 95° C. In some examples, the temperatures for these steps is 95° C. or less, 75° C. or less, or 65° C. or less.

Acids may be used to chelate metals in the oil and/or hydrate non-hydratable phospholipids. The aqueous acid may comprise inorganic or organic acids including, but are not limited to, phosphoric acid, hydrochloric acid, sulfuric acid, ascorbic acid, acetic acid, citric acid, fumaric acid, maleic acid, tartaric acid, succinic acid, glycolic acid and any mixtures thereof. Bases may be selected from the group consisting of sodium hydroxide, potassium hydroxide, sodium silicate, sodium carbonate, calcium carbonate, and any combinations thereof.

Use of a relatively short cavitation mixing time, optionally in conjunction with water addition in the first stage, and further optionally in conjunction with a reduced acid amount (for the avoidance of doubt, any combination or sub-combination of these features may be utilized in examples of the disclosure), may result in a beneficially reduced amount of 3-MCPD in the processed oil. In some examples, the methods of the disclosure result in a reduction of about 20% or more in the amount of 3-MCPD as compared to processed oils not treated with one or more of the above features of the example methods.

For example, the amount of 3-MCPD may be reduced by about 20% or more when the oil is subjected to a relatively short cavitation mixing time, as compared to an oil that is subjected to a longer mixing time, but is otherwise processed in the same or a similar manner. As another example, the amount of 3-MCPD may be reduced when water is added during or after the first step, as compared to the amount of 3-MCPD in an oil that does not have water added during or after the first step, but is otherwise processed in the same or a similar manner. As another example, the amount of 3-MCPD may be reduced when the oil is treated using a reduced amount of acid, as compared to an oil that is treated with a larger amount of acid, but is otherwise processed in the same or a similar manner.

In some examples, the amount of 3-MCPD is reduced by about 10% or more, about 15% or more, about 30% or more, as compared to an oil that is processed without using one or more of the noted features. In certain embodiments, the amount of 3-MCPD is reduced by about 25% or more, about 35% or more, about 40% or more, about 45% or more, about 50% or more, about 55% or more, about 60% or more, about 70% or more, about 75% or more, or about 80% or more.

The following examples are presented to illustrate the present disclosure and to assist one of ordinary skill in making and using the same. The examples are not intended in any way to otherwise limit the scope of the disclosure.

EXAMPLE 1

A comparative example was prepared utilizing example traditional mixing processes, which utilize relatively long cavitation mixing durations on the scale of minutes or even hours. 500 g crude palm oil was heated to 65° C. in a glass beaker on a hot plate fitted with a thermocouple to maintain a certain temperature setting. Stoichiometric amount of 85% concentrated phosphoric acid was dosed at 0.15 ml (0.03% wt) to form a reaction mixture followed by hydrodynamic cavitation mixing at 15,000 rpm for 60 seconds using IKA T-25 ULTRA-TURRAX rotor-stator high-speed homogenizer. The cavitated reaction mixture was then mixed by stir bar on magnetic stir plate for 1 hr at ~300 rpm. The reaction mixture was then transferred to plastic bottles for centrifugation at 3000 rpm for 10 minutes to separate gums and oil fractions. The separated oil (300 g) was then transferred to glass round-bottom flask and placed in a heating mantle set on a heated stir plate. Bleaching clay was dosed at 1.0% into the oil for 20 min at 105-110° C. under vacuum (5 torr). The oil was cooled to ~70° C. and filtered with vacuum thru #40 Whatman filter paper fitted in a Buchner funnel to separate the spent clay and oil. After filtration, 200 g of the bleached oil was deodorized under vacuum (1 torr) at 260° C. for 30 min. The crude and RBD PO (refined, bleached and deodorized palm oil) were collected for analyses.

A sample of RBD PO according to an example method of the disclosure, utilizing a short cavitation mixing time, was then prepared. In this example, 500 g crude palm oil was heated to 65° C. in glass beaker on hot plate fitted with a thermocouple to maintain a certain temperature setting. Stoichiometric amount of 85% concentrated phosphoric acid was dosed at 0.15 ml (0.03% wt) to form a reaction mixture followed by hydrodynamic cavitation mixing for 0.37 seconds by passing in a single pass CaviMax cavitational processor. The orifices used were first 0.047 inches in diameter followed by 0.063 inches in diameter orifice. The cavitated reaction mixture was then mixed by stir bar on magnetic stir plate for 15 min at ~300 rpm. After heating, the reaction mixture was centrifuged as previously described. The separated oil was as well further bleached and deodorized as previously described. Table 1 shows the result (where "BDL" indicates levels below detection limit).

TABLE 1

| RBD Analysis | Crude | Comparative Example (60 Seconds of Cavitation Mixing) | Disclosure Example (0.37 Seconds of Cavitation Mixing) |
|---|---|---|---|
| % FFA | 5 | 0.025 | 0.021 |
| PV | | 0 | 0 |
| Na | BDL | BDL | BDL |
| Ca | 4.95 | BDL | BDL |
| Mg | 23.1 | 0.142 | BDL |
| Fe | 8.76 | BDL | BDL |
| Ni | BDL | BDL | BDL |
| Cu | BDL | BDL | BDL |
| P | 24.2 | 4.77 | 2.21 |
| 3-MCPD ug/g | <0.1 | 4.48 | 2.94 |
| GE ug/g | <0.1 | 1.44 | 0.7 |

EXAMPLE 2

The crude palm oil of Example 2 was processed as in Example 1. Additionally 10 ml (2% wt) of de-ionized water was added to the reaction mixture before cavitation mixing. Table 2 shows the result.

TABLE 2

| RBD Analysis | Crude | Comparative Example (60 Seconds of Cavitation Mixing) | Disclosure Example (0.37 Seconds of Cavitation Mixing) |
|---|---|---|---|
| % FFA | 5 | 0.022 | 0.021 |
| PV | | 0 | 0 |
| Na | BDL | BDL | BDL |
| Ca | 4.95 | BDL | BDL |
| Mg | 23.1 | BDL | BDL |
| Fe | 8.76 | 0.282 | 0.707 |
| Ni | BDL | BDL | BDL |
| Cu | BDL | BDL | BDL |
| P | 24.2 | BDL | BDL |
| 3-MCPD ug/g | <0.1 | 4.19 | 1.83 |
| GE ug/g | <0.1 | 2.09 | 0.69 |

EXAMPLE 3

The crude palm oil of Example 3 was processed as described in Example 1 but with a reduced amount of acid; a nonstoichiometric (20% reduced) amount of 85% concentrated phosphoric acid was dosed at 0.12 ml (0.024% wt) and additionally 10 ml (2% wt) of de-ionized water was added to the reaction mixture before cavitation mixing. Table 3 shows the result.

TABLE 3

| RBD Analysis | Crude | Comparative Example (60 Seconds of Cavitation Mixing) | Disclosure Example (0.37 Seconds of Cavitation Mixing) |
|---|---|---|---|
| % FFA | 5 | 0.023 | 0.025 |
| PV | | 0 | 0 |
| Na | BDL | BDL | BDL |
| Ca | 4.95 | BDL | 1.32 |
| Mg | 23.1 | 0.154 | 0.181 |
| Fe | 8.76 | 0.958 | 0.77 |
| Ni | BDL | BDL | BDL |
| Cu | BDL | BDL | BDL |
| P | 24.2 | 0.549 | 1.45 |
| 3-MCPD ug/g | <0.1 | 3.65 | 0.95 |
| GE ug/g | <0.1 | 1.26 | 0.9 |

The data shows that the content of 3-MCPD was lower when cavitation was used for shorter cavitation mixing time for all 3 trial sets. The shorter cavitation mixing time advantageously and surprisingly resulted in lower 3-MCPD amounts. The highest reduction in these examples was obtained with reduced acid dosage and 2% water addition with a short cavitation mixing time of 0.37 seconds, i.e. 0.95 ug/g 3-MCPD (see Table 3, column 4), compared to 4.48 ug/g 3-MCPD in the initial comparative example using a longer cavitation mixing time of 60 seconds, without water addition and without a reduced acid amount (see Table 1, column 3). The amount of 3-MCPD in Example 3, with cavitation mixing time of 0.37 seconds, was approximately 21% of the 3-MCPD generated in the initial comparative Example with a cavitation mixing time of 60 seconds, and therefore resulting in a reduction of about 80% of 3-MCPD. Other 3-MCPD levels from the above disclosure examples are approximately 66%, 41%, 44%, 23%, and 26% of the amounts of 3-MCPD in the above comparative examples that lack one or more of the processing characteristics of the disclosure examples (i.e. the amounts of 3-MCPD are reduced as compared to a comparative example lacking one or more of short cavitation mixing time, water addition, and/or reduced acid amount). Table 4 below further illustrates the reduction in 3-MCPD levels.

TABLE 4

| 3-MCPD Level of Comparative Example 1 (Longer Cavitation, No Added Water, No Reduced Acid Amount) | 3-MCPD Levels of Disclosure Examples 1-3 | Relative Ratio | Relative Percentage | Percentage Reduction |
|---|---|---|---|---|
| 4.48 | 2.94 | 0.66 | 65.63 | 34.38 |
| 4.48 | 1.83 | 0.41 | 40.85 | 59.15 |
| 4.48 | 0.95 | 0.21 | 21.21 | 78.79 |
| **3-MCPD Level of Comparative Example 2 (Longer Cavitation, Water Added, No Reduced Acid Amount)** | **3-MCPD Levels of Disclosure Examples 2-3** | **Relative Ratio** | **Relative Percentage** | **Percentage Reduction** |
| 4.19 | 1.83 | 0.44 | 43.68 | 56.32 |
| 4.19 | 0.95 | 0.23 | 22.67 | 77.33 |
| **3-MCPD Level of Comparative Example 3 (Longer Cavitation, Water Added, Reduced Acid Amount)** | **3-MCPD Level of Disclosure Example 3** | **Relative Ratio** | **Relative Percentage** | **Percentage Reduction** |
| 3.65 | 0.95 | 0.26 | 26.03 | 73.97 |

The examples further show that the shorter cavitation mixing time results in a more dramatic drop in 3-MCPD amount, even when other beneficial features of the disclosure are used. For example, the relative amount of 3-MCPD in Tables 1 and 2 show that, while the addition of water lowers 3-MCPD content even in the comparative example, a greater reduction in 3-MCPD is obtained when combined with the shorter cavitation mixing time.

The invention claimed is:

1. A method for refined palm oil production with reduced 3-MCPD formation, the method comprising, (a) premixing a palm oil with an acid to chelate metals and form a reaction mixture; and (b) subjecting the reaction mixture obtained in step (a) to hydrodynamic cavitation mixing for less than 0.5 seconds.

2. The method of claim 1, wherein the reaction mixture obtained in step (b) is subjected to additional mixing.

3. The method of claim 1 wherein the reaction mixture obtained in step (a) is subjected to the hydrodynamic cavitation mixing for 0.37 seconds.

4. The method of claim 1, further comprising adding water to the reaction mixture during or after step (a).

5. The method of claim 1, wherein the acid is selected from the group consisting of phosphoric acid, hydrochloric acid, sulfuric acid, ascorbic acid, acetic acid, citric acid, fumaric acid, maleic acid, tartaric acid, succinic acid, glycolic acid, or combinations thereof.

6. The method of claim 1, wherein the hydrodynamic cavitation mixing of step (b) comprises passing the reaction mixture of step (a) through one or more orifices, nozzles or apertures, or a combination thereof, in local constriction.

7. The method of claim 1, wherein the reaction mixture obtained in step (a) is subjected to the hydrodynamic cavitation mixing for less than 0.4 seconds.

8. The method of claim 6 wherein each orifice, nozzle or aperture has a circular, non-circular, elliptical, rectangular, annular, polygonal or slit type sectional shape.

9. The method of claim 6 wherein the orifices, nozzles or apertures are arranged in succession.

10. The method of claim 1, wherein the reaction mixture obtained in step (a) is subjected to the hydrodynamic cavitation mixing for less than 0.4 seconds, wherein the reaction mixture obtained in step (b) is subjected to bleaching and deodorizing to obtain a refined, bleached and deodorized palm oil.

11. The method of claim 1, wherein the reaction mixture obtained in step (a) is subjected to the hydrodynamic cavitation mixing for less than 0.3 seconds, wherein the reaction mixture obtained in step (b) is subjected to bleaching and deodorizing to obtain a refined, bleached and deodorized palm oil.

12. The method of claim 1, wherein water is added to the reaction mixture obtained in step (a), wherein the reaction mixture obtained in step (b) is subjected to bleaching and deodorizing to obtain a refined, bleached and deodorized palm oil.

13. The method of claim 1, wherein one or both of the following conditions is met:

water is added to the reaction mixture of step (a); and an amount of acid in the reaction mixture of step (a) is 80% or less of a stoichiometric amount of the acid necessary to hydrolyze phospholipids of the palm oil; and wherein the reaction mixture obtained in step (b) is subjected to bleaching and deodorizing to obtain a refined, bleached and deodorized palm oil, and wherein the amount of 3-MCPD in the refined, bleached and deodorized palm oil is reduced by at least 60% in comparison to the amount of 3-MCPD in a refined, bleached and deodorized palm oil that is produced using the same method, with the exception of using a longer cavitation mixing time, and without either one of the conditions.

14. The method of claim 1, wherein one or both of the following conditions is met:

water is added to the reaction mixture of step (a); and an amount of acid in the reaction mixture of step (a) is 80% or less of a stoichiometric amount of the acid necessary to hydrolyze phospholipids of the palm oil; and wherein the reaction mixture obtained in step (b) is subjected to bleaching and deodorizing to obtain a refined, bleached and deodorized palm oil, and wherein the amount of 3-MCPD in the refined, bleached and deodorized palm oil is reduced by at least 75% in comparison to the amount of 3-MCPD in a refined, bleached and deodorized palm oil that is produced using the same method, with the exception of using a longer cavitation mixing time, and without either one of the conditions.

15. The method of claim 1, wherein the palm oil contains phospholipids and the premixing acid is added in an amount sufficient to hydrolyze the phospholipids.

16. The method of claim 15, wherein the reaction mixture from step (a) contains a stoichiometric amount of the acid necessary to hydrolyze the phospholipids.

17. The method of claim 15, wherein the reaction mixture from step (a) is 80% or less of a stoichiometric amount of the acid necessary to hydrolyze the phospholipids.

18. The method of claim 4, wherein the additional water is added in an amount of less than 2% by weight of the oil.

19. The method of claim 10, wherein the deodorizing is carried out at a temperature of 100 degrees C. or more.

20. The method of claim 2, wherein the reaction mixture obtained in step (b) is additionally mixed for at least 15 minutes.

* * * * *